United States Patent [19]

Chisholm

[11] Patent Number: 4,680,587
[45] Date of Patent: Jul. 14, 1987

[54] INSTRUMENT LANDING SYSTEM

[75] Inventor: John P. Chisholm, Olympic Valley, Calif.

[73] Assignee: Sundstrand Data Control, Inc., Redmond, Wash.

[21] Appl. No.: 765,490

[22] Filed: Aug. 14, 1985

[51] Int. Cl.$^4$ ............................................. G01S 13/86
[52] U.S. Cl. ......................................... 342/33; 342/56
[58] Field of Search ................. 343/5 LS, 6 R, 7.3; 342/33, 56, 95

[56] References Cited

U.S. PATENT DOCUMENTS

| | | | |
|---|---|---|---|
| 4,010,465 | 3/1977 | Dodington et al. | 342/35 |
| 4,069,412 | 1/1978 | Foster et al. | 342/49 X |
| 4,126,859 | 11/1978 | Böhm | 342/33 |
| 4,162,495 | 7/1979 | Prill | 342/49 |
| 4,429,312 | 1/1984 | Chisholm | 342/155 X |
| 4,454,510 | 6/1984 | Crow | 342/32 |

Primary Examiner—T. H. Tubbesing
Attorney, Agent, or Firm—James A. Gabala; Harold A. Williamson; James A. Wanner

[57] ABSTRACT

In a single-frequency precision guidance landing system, the use of a DME interrogator in the aircraft and a DME receiver at the ground installation, each tuned to the same DME channel frequency, to uniquely interrogate a selected ground station and hence identify it by virtue of its replies being synchronous in the aircraft with the interrogations, the interrogations and the replies also being used to obtain range to the ground installation. This technique uses airborne already-installed DME interrogators for selective interrogation of a desired landing installation, thereby to eliminate any need to add additional special purpose equipment to the aircraft to accomplish the desired uniqueness of interrogation and ground installation identification achieved by this invention.

9 Claims, 2 Drawing Figures

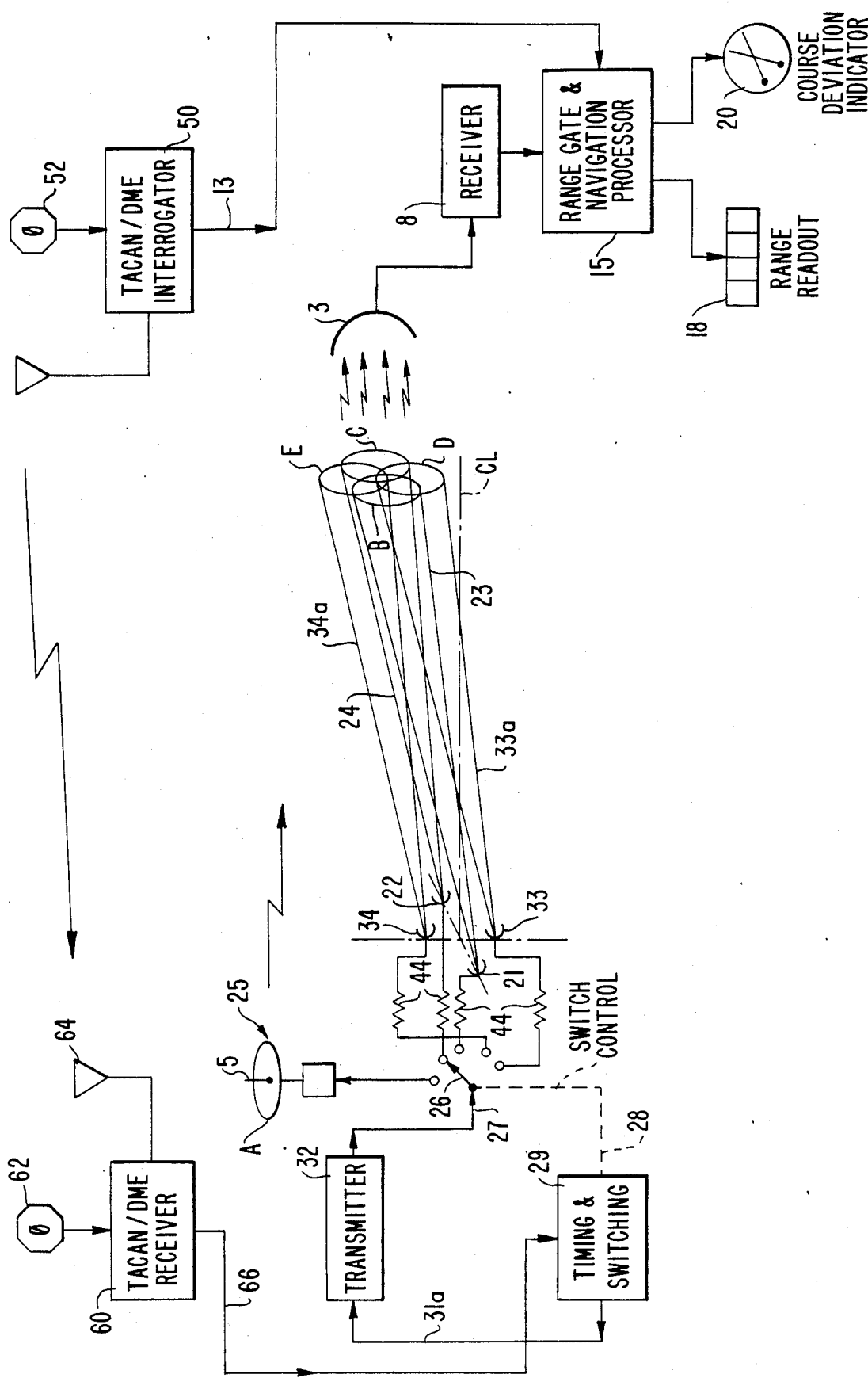

INSTRUMENT LANDING SYSTEM

BACKGROUND AND PRIOR ART

This invention relates to an improved instrument landing system, and more particularly relates to improvements in a type of landing system in which all installations sequentially radiate guidance pulses on the same frequency, the improvements permitting the ground installation of such a same-frequency landing system to be uniquely interrogated and hence identified by an approaching aircraft.

In cases where a ground installation of such a single frequency landing system is remotely located from other similar installations there is no need to be able to uniquely interrogate it and hence identify it to an approaching aircraft. However, in impacted geographic locations where there are multiple similar landing installations located relatively closely together it is necessary to provide means for uniquely interrogating and identifying one such same-frequency installation to the exclusion of others in the vicinity.

In conventional landing systems such as the present ILS and MLS systems, unique identification and signal exchanges between approaching aircraft and a particular ground installation are established by uniquely assigning different frequencies out of a band of frequencies to each of the various installations, and tuning the airborne units to the frequency of the selected installation. In my U.S. Pat. No. 4,429,312 entitled Independent Landing Monitoring System, a different type of identification of a same-frequency landing installation is discussed in which some of the signals transmitted to the aircraft are pulse encoded to identify that installation.

In this invention, ground installation identification is established by a unique interrogation technique, and in addition, the invention provides improved range data generation by the landing system which improved ranging is related to the presently disclosed unique technique of interrogation and station identification.

A very desirable characteristic for a landing system is the capability of providing range to touchdown, thereby to provide range data which serves three major purposes. A first purpose is providing range data for alerting the pilot of his proximity to touchdown. A second purpose is to provide means for automatically reducing the gain of the landing installation as the aircraft range to touchdown diminishes in order to maintain loop stability, often referred to as "course softening". A third purpose in providing range data which can be used, together with the elevational angular data provided by the landing system, to determine altitude above the runway during approach.

In the conventional ILS system, range to touchdown is generally provided by marker beacons on the ground at established distances from touchdown. These beacons radiate vertical fan shaped-beams through which the approaching aircraft passes. The range information thus acquired in the aircraft is used for pilot alerting and for "course softening" purposes.

In MLS and ILS practice, an alternative more accurate measurement of range is provided by conventional TACAN/DME interrogators which are carried by almost all aircraft. The airborne TACAN/DME equipment interrogates a DME beacon that is co-located with the MLS or ILS ground installation and receives therefrom a direct measurement of range using usual DME techniques. The DME units are assigned a band of freqency channels in the 1000 MHz range, which band is separate from the 100–300 MHz frequency band allocated to ILS systems in current use or the 5000–5250 MHz band assigned to MLS.

For some landing applications, a very precise measurement of range is required, and for this purpose a Precision DME, usually referred to as PDME, is employed. The PDME is similar to the conventional DME, but uses faster rise time pulses to obtain higher precision. This PDME system imposes on aircraft, which have to use it in order to obtain a required very precise measurement of range, the additional burden of having installed on board appropriate PDME airborne equipment. Another technique for obtaining precision range in a landing system is provided by the teaching of my U.S. Pat. No. 4,429,312. Range is measured in that disclosure by having the weather radar interrogate the landing system ground installation and trigger the transmission of pulsed angular guidance signals. These pulsed replies are synchronous with the weather radar interrogations and are range tracked in a conventional manner to provide precision range in the aircraft. Range measurements of higher precision can be obtained by the use of fast rise time pulses.

Both of the above ways for identifying ground station installations, i.e. frequency selection or pulse group encoding, require additional adjustable cockpit controls for either tuning to the frequency of the ground installation, or for selecting the decodement of the signals radiated from that ground station. The measurement of range by means of marker beacons or DME equipment requires the installation of appropriate marker beacons or DME beacons with the landing system ground installation. The measurement of very precise range requires the addition of specialized PDME equipment, both air and ground. While the use of the weather radar to provide precision range, as taught in my U.S. Pat. No. 4,429,312, eliminates the need for added PDME equipment, not all aircraft carry a weather radar. Thus all conventional landing systems therefore have tended to require either added airborne equipment, or cockpit controls, or both, in order to achieve unique communication with a selected ground installation.

Considered broadly, a landing system does not inherently require the use of multiple different frequencies since operation at all installation sites is usually performed on a single frequency. Single-frequency operation is an advantage because if the actual landing guidance system can always operate on the same frequency for different sites, great simplification in terms of airborne equipment complexity is made possible since the receiver can be fixed-frequency. A technique to achieve both station selection and ranging data in a fixed frequency landing system, using only airborne equipment which is already installed in IFR aircraft, would eliminate the need to install in the aircraft any additional channel selection switches or decoder control switches, and hence would result in much simpler and lower cost airborne landing system installations.

THE INVENTION

This invention relates to an improved landing system in which the ground-installation responses to interrogations by an approaching aircraft comprise groups of guidance pulses which are normally radiated on the same frequency for all ground installations. Since IFR equipped aircraft always include a DME interrogator, the teaching of this invention is to use the DME interrogator already installed in the aircraft to interrogate a DME receiver at the selected ground installation, with the output for the DME ground receiver triggering the radiation of at least some of the guidance pulse responses. Since there are 252 DME channels, therefore, in any particular geographic location, there are always a number of unused channels available, and one such available channel can be uniquely assigned to each landing system installation for the purpose of identifying it by unique interrogation thereof.

In practice, the pilot of an aircraft will have available to him from published navigational information the correct channel to select on his DME interrogator to trigger the landing installation he intends to approach. His DME interrogator will then periodically interrogate a TACAN/DME receiver at that ground installation, which receiver will be wired to trigger the ground installation timing and switching circuitry, which then appropriately drives the pulse transmitter of the selected ground installation to begin the radiation of precision guidance signals. Thus, by selecting different DME channels, the pilot can uniquely select different landing system installations to guide his approach.

In the aircraft, besides the DME interrogator, there will be a receiver fixed-tuned to receive the ground installation's pulse responses, and a programmed processor which is provided with a timing signal to indicate to it when the airborne DME interrogator transmitted an interrogation to the ground installation to trigger its guidance signal response. The airborne processor is therefore able to identify the signals of interest from the selected ground installation, i.e. the installation being interrogated by that aircraft, in contrast to other same-frequency signals resulting from other aircraft interrogations or from other ground installations. This identification results from the fact that the signals of interest are synchronous with the aircraft's own airborne interrogations, and hence can be range tracked, whereby the aircraft uses only response pulses within its range tracking gate. In this system, the ground installation interrogating signal from the aircraft will be transmitted on an appropriate one of the 252 standard DME channels, but the pulse responses from the ground installation will be in a different frequency band, i.e. at a particular single frequency used by all landing systems of this type. Thus this system uses cross-band interrogation and response frequencies. Range to touchdown is obtained based upon the time lapse between the DME interrogation signal to the ground installation, and the time of reception of the ground installation's pulsed response.

The basic identification technique therefore involves range tracking and processing only responses that are synchronous with that aircraft's own interrogations of the selected ground station, and in this respect is similar to conventional DME functioning in which non-synchronous received signals are ignored. It is therefore possible for plural aircraft to simultaneously use a single selected landing station in the presence of other same-frequency stations, and to obtain both precision angular guidance and range without mutual interference since their interrogations will bear random relationship to each other. A basic difference however is that this system uses cross-band transmissions, i.e. interrogations in a DME channel, and responses in a different frequency band more suitable to the radiation of precision landing guidance beams. The particular ground station interrogated will be determined by selection of the particular DME channel which has been assigned to it.

The precision of the ranging technique according to this invention is improved by the fact that the signals radiated as a reply to each interrogation and used for ranging in the aircraft, can utilize fast rise time pulses, in contrast to the slow rise times of conventional DME replies. The use of fast rise time pulse replies is aided by the use of only one frequency channel for their transmission, which single channel can therefore be made wider to accommodate faster rise times.

It should further be noted that in a system as disclosed herein using DME interrogators to trigger replies from the precision guidance ground installation, such ground installations can still also transmit randomly timed precision guidance paired signals which are initiated by a local squitter generator for use by aircraft which do not include airborne interrogators. Such ground installations could be used in areas not including other similar possibly interfering systems in the immediate geographic vicinity. Squitter operation would be analogous to usual TACAN/DME operation, and is of the general type which is described as an alternative embodiment in my U.S. Pat. No. 4,429,312. Squitter initiated precision guidance sequences would include also an omni radiated signal which would still be encoded to identify the ground installation. It should be noted that, in general, only signals from the selectively interrogated ground stations will fall inside the range tracking gate and will be processed. Occasionally, however, same-frequency signals from other ground installations in the vicinity can fall within the tracking gate and hence, if processed, would tend to generate guidance errors since they are actually providing guidance to another location. There are well known techniques to minimize this problem, i.e. averaging, and "wild-point" elimination.

OBJECTS AND ADVANTAGES OF THE INVENTION

It is a principal object of this invention to provide in a single-frequency precision guidance landing system the capability of uniquely interrogating a selected ground station and hence identifying it by virtue of its replies being synchronous in the aircraft with the interrogations, such technique using already-existing airborne DME interrogators to uniquely interrogate each different landing installation via different DME channels assigned thereto, thereby eliminating any need to add additional special purpose equipment to the aircraft to achieve such uniqueness of interrogation and identification.

It is a corollary object of the invention to reduce the complexity of airborne equipment and the cost of initial installation and maintenance by utilizing what is already included aboard all IFR capability aircraft to achieve unique interrogations of precision guidance landing installations, and to use the combination of the airborne DME interrogator, a fixed frequency receiver and landing guidance processor in the aircraft to range to the ground station and process only range-tracked responses for guidance purposes. At present, there is no wired interconnection and cooperation between DME equipment and landing system guidance installations, either ground based or airborne. This invention proposes their interconnection to achieve reduction of complexity of the landing system installations and accompanying economies and weight reduction, while providing selection by frequency of particular ground based precision landing installations with accompanying positive identification thereof and ranging thereto.

Other objects and advantages of the invention will become apparent during the following discussion of the drawings.

BRIEF DESCRIPTION OF THE DRAWINGS

FIG. 2 is a block diagram similar to FIG. 1 but showing improvements according to this invention.

DESCRIPTION OF PREFERRED EMBODIMENT

Although this invention provides techniques which are applicable to many different landing systems, and therefore are not to be limited to improvements to the precision landing system of the type shown and described in my U.S. Pat. No. 4,429,312, supra, a preferred embodiment of the present improved system will be illustrated and described with reference to the landing system of that patent.

As shown in the patent, and described in columns 8 and 9 thereof, the patented system provides a ground based precision landing guidance installation which radiates localizer and glide slope guidance beams from separate antennas which are directed along the approach path toward a landing aircraft, and which are received in the aircraft and processed to recover signals which provide landing indications to the pilot. In the system shown in U.S. Pat. No. 4,429,312 the ground based system can either be triggered to respond to interrogations from the approaching aircraft, transmitted by its weather radar, or can be free running and simply received and used by an approaching aircraft which does not have a weather radar. The former type of triggered system is the system to which the present improvements are directed, and therefore the free running mode of operation of the landing system will not be further discussed.

Figure 1:
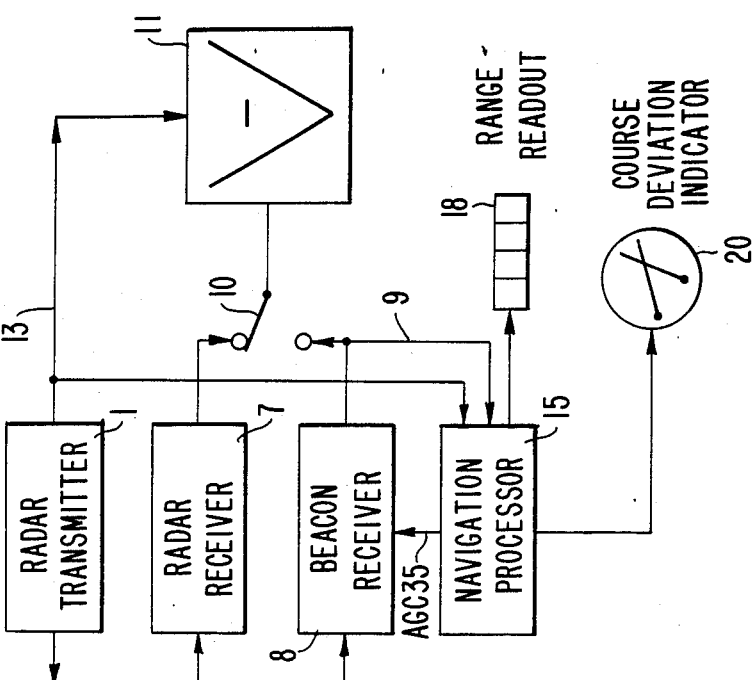
FIG. 1 is a block diagram of a typical prior-art landing system including both ground based and airborne installations.
Figure 1:
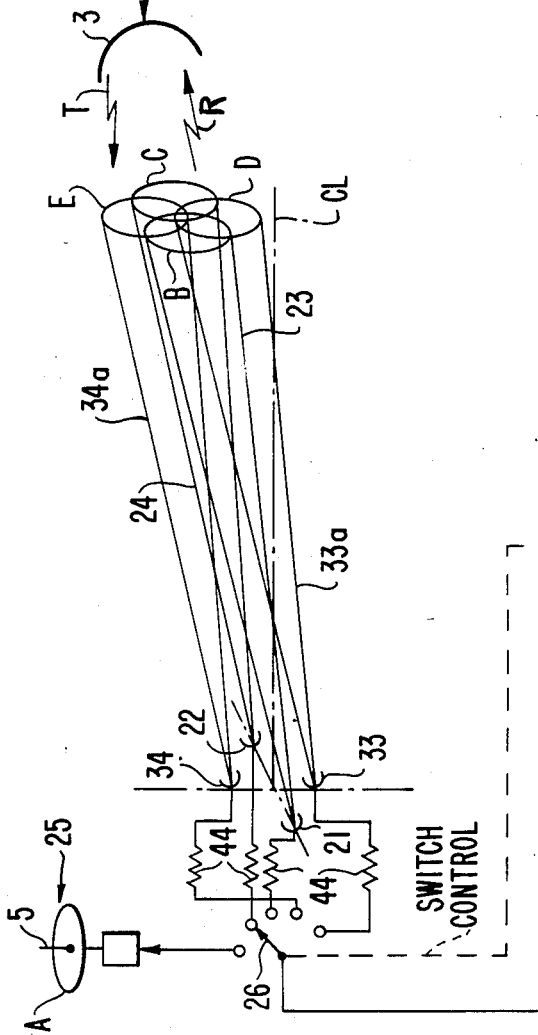

FIG. 1 shows the basic precision landing guidance system of U.S. Pat. No. 4,429,312, which includes for lateral aircraft guidance two directive antennas 21 and 22 having precision guidance localizer antenna beam patterns 23 and 24, marked B and C. The ground installation also includes a non-directive antenna 5 delivering an omni-pattern 25. These antennas 5, 21 and 22 are connected by a switch 26 and cable 27 to a radar beacon 6, which conventionally includes a transmitter 32 and a receiver 30, and which includes timing and switching circuitry 29 which controls the switch 26 and initiates the outputs of the transmitter 32. For vertical glideslope guidance, the ground installation further includes two directive antennas 33 and 34 for radiating paired precision glideslope guidance beams 33a and 34a, marked D and E, which antennas are likewise connected to the transmitter 32 through the antenna switch 26. The paired beam patterns of the antennas 23 and 24 for lateral guidance overlap so that they provide equal intensity signals along the extended centerline CL of the runway. Thus, if the signal intensities of both antennas are equal as received in the airborne vehicle, it must be laterally located over the centerline of the runway. Likewise, the directive antenna patterns of two paired glideslope antennas 33 and 34 are aligned and partially overlapped respectively above and below a predetermined glideslope (usually 3°), so that for aircraft approaching precisely along the glideslope, the signal intensities received in the aircraft from these paired antennas 33 and 34 will be equal. Thus for an on-course approach, all four guidance signal intensities received in the aircraft will be equal. However, deviation above or below, or to the right or left of the desired approach course, will cause an unbalance in the paired signals received at the receiver, indicating to the pilot the direction in which the aircraft has deviated from the desired course. This operation is thoroughly described in U.S. Pat. No. 4,429,312.

The airborne installation of the system according to that patent is shown to the right in FIG. 1, and includes a weather radar which transmits and receives through the antenna 3. The radar conventionally includes a radar transmitter 1, a radar receiver 7, a beacon receiver 8, a switch 10, and a conventional radar indicator 11. The switch 10 is used to connect the radar indicator 11 to either the radar receiver 7 to display conventional radar echoes, or to the beacon receiver 8 to display beacon returns, all as well known in the art. The beacon receiver 8 is also connected to a range gate and navigation processor 15 which provides range data to a range readout 18 and to a course deviation indicator 20 connected thereto. The airborne radar transmitter 1 is used to trigger a response sequence from the ground installation by transmitting a trigger signal T thereto which is received by the omni antenna 5 and delivered through the ground receiver 30 to the timing and switching circuitry 29 which then initiates a response sequence from the ground installation. This response sequence includes multiple successively delivered transmissions. First, the timing and switching circuitry 29 delivers through the omni antenna 5 a coded pulse group reference signal A from the transmitter which identifies the ground installation, and also provides range information in the aircraft as well as a signal whose strength is used to set the gain of the aircraft receiver so as to keep the airborne receiver operating within a linear portion of its response characteristic. After a fixed delay determined by the timing and switching circuitry, the switch 26 then steps sequentially to connect the transmitter 32 in turn to each of the four directive antennas to deliver responses R including right and left paired localizer pulses, and to deliver up and down paired glideslope pulses. These pulses are delivered one at a time with suitable delays between them. Adjustable attenuators 44 serve to balance the antenna drives so that the guidance signals are all of equal amplitude when the aircraft is exactly on course for landing, as explained in U.S. Pat. No. 4,429,312. The sequence of these four guidance signals is predetermined and fixed so that the aircraft can identify the signals by their order in the succession.

The pulses radiated in these precision guidance beams B, C, D and E in FIG. 1, plus the reference signal group A from the omni antenna, are received at the airborne antenna 3, and delivered by the beacon receiver 8 to the processor 15 in the aircraft. The processor 15 is programmed to use the reference signal A to determine range and to display it at the range readout 18, and to use the precision landing signals B, C, D and E to create and deliver to the course deviation indicator 20 output signals which show the position of the aircraft with respect to the desired approach path. These techniques define a type of prior art system on which the present invention seeks to improve.

The precision guidance system shown in FIG. 1 is generally satisfactory when the aircraft has a weather radar to interrogate the ground installation, and a decoding circuit has been added to the radar together with an appropriate code selector switch for station selection in the cockpit. However, not all aircraft have weather radars to interrogate the ground installation, and in addition, it is often not desirable to add a code selector switch in an already overcrowded cockpit, as in fighter aircraft, for example. In addition, where there are several airfields in close geographic proximity, and/or where there are several landing installations of this type at the same airport, the same-frequency signals from all such landing systems can arrive at the aircraft synchronously and hence they can not be adequately separated for unique range tracking and guidance generation purposes. This is basically the same problem that plagues the conventional radar/beacon system (ATCRBS) used by the FAA for air traffic control purposes. It is called "garbling". The weather radar technique of U.S. Pat. No. 4,429,312, with associated identifying codes, is thus very suitable for use at isolated remote sites, such as offshore oil rigs, but not suitable for areas with many same-frequency landing systems in close proximity. The problem comes basically from the fact that these systems, and the airborne radars all use a common frequency, and there is no way to trigger one particular installation uniquely. There is therefore always the risk of undesirably triggering a nearby installation with the result that confusing responses to the aircraft from both locations will be synchronously received in that aircraft.

FIG. 2 shows the system according to the present invention which improves over the prior art system shown in FIG. 1. As pointed out above in this specification, at any particular geographic location, there are always far more of the 252 TACAN/DME channels available for use than are actually in use. Moreover, almost all aircraft already have either TACAN or DME capability on board, while many light aircraft and military aircraft may not have weather radar on board, as would be required in the prior art system shown in FIG. 1.

This invention proposes to trigger the response of a selected ground installation by using the TACAN or DME interrogator 50 already on board the aircraft. The airborne DME interrogator is free running so that it will repeatedly trigger the ground installation using a channel which is not otherwise in use in that geographic location. In order to implement this invention, the ground installation must be provided with a TACAN/DME receiver 60 tuned by a conventional tuning control 62 to that channel which is uniquely assigned to it. The TACAN/DME receiver 60 is operative to trigger the transmitter 32 through timing and switching circuitry 29. The TACAN/DME receiver 60 has its own antenna 64 which is appropriate for receiving signals in the 1000 MHz range used by TACAN/DME, and the receiver outputs trigger signals for each received interrogation via wire 66, corresponding in fuction with the triggering wire 31 in FIG. 1, to drive the timing and switching circuitry 29. As is the case in FIG. 1, the timing and switching circuitry 29 sets the switch 26 to the correct position, provides delays, and drives the transmitter to deliver the omni encoded reference signal A followed by the two sets of paired directive signals B and C, and D and E.

In the aircraft, the DME unit 50 is tunable by the control 52 to whatever channel the pilot selects in order to trigger the desired ground installation. The TACAN/DME interrogator 50 will then continue to periodically trigger the ground installation so that signals returned from the ground installation will be synchronous with respect to the interrogations from that particular aircraft, and thus identifiable as the returns of interest in that aircraft as distinguished from same-frequency non-synchronous returns from the same or other nearby ground installations in the vicinity. The airborne installation will also include an airborne receiver 8 corresponding to that in FIG. 1 and tuned to receive the omni reference signal A and the paired directive signals B and C, and D and E from the ground installation. The TACAN/DME interrogator 50 is connected to deliver a timing signal via wire 13 to the navigation processor 15 to indicate when its interrogation signal was sent out. The processor 15 uses this timing signal and the reception of the omni reference signal A from the ground installation to determine range to the ground installation and display it at the range readout 18. In addition, the processor includes a range gate for tracking all of the ground installation response signals, including the omni signals A and the paired directive signals B and C, and D and E from the ground installation. The directive signals are processed to give precision guidance to the pilot using the visual course deviation indicator display 20 which is the same as in FIG. 1. Infrequently, however, other same-frequency signals from the selected landing installation or other landing installations in the vicinity, will fall within the range gate, just as they do in conventional DME range tracking. The effect of these same-frequency signals will be minor, if averaged with the desired signals from the selected ground installation, since they occur relatively infrequently. It is possible however to further minimize even this minor effect by storing the values of all received signals that fall within the range gate in computer memory, and by utilizing for guidance purposes only those stored signals that fall within prescribed limits of the running average of all signals. This is termed "wild-point" editing. Thus on the ground, the radar receiver 30 of FIG. 1 has been replaced by a TACAN/DME receiver 60, and in the air, the radar transmitter 1 and receiver 7 have been replaced by a TACAN/DME interrogator 50, with the result that one ground installation at a time can be uniquely interrogated via its own assigned frequency channel.

This invention is not to be limited to the embodiments shown and described, because changes may be made within the scope of the following claims.

I claim:

1. An improved landing system for landing an aircraft along a preferred landing guidance path including a predetermined glideslope and a centerline, the landing system being of the type having ground installations each including a trigger input operative in response to reception of an interrogating signal from a landing aircraft to actuate a transmitter to radiate a sequence of responses to the aircraft which responses include precision guidance signals radiated through directional guidance antennas directed along the guidance path, and the landing system having airborne installations each including means for receiving said responses and means for processing them to provide indications for guiding the landing of the aircraft, the improvements comprising:

(a) at each participating ground installation, a TACAN/DME receiver tuned to a DME frequency assigned to that particular ground installation, the TACAN/DME receiver having a trigger output occurring in response to reception of an interrogating signal, which output is connected to the trigger input of the ground installation; and (b) in each participating aircraft an airborne installation including a TACAN/DME interrogator and antenna means for radiating interrogating signals to a ground installation, the interrogator being tunable to assigned DME frequencies whereby to select and uniquely interrogate a particular one of the ground installations, and the interrogator having a timing signal output connected to the airborne processing means for indicating the instant of transmission of each interrogating signal, whereby received responses to interrogating signals will be synchronous with the interrogating signals generated in a particular airborne installation.

2. An improved landing system as claimed in claim 1, wherein the sequence of responses radiated from a ground installation to an aircraft in response to an interrogating signal therefrom includes a reference signal transmitted by the ground installation upon reception thereat of an interrogating signal; and wherein said airborne processing means comprises means for determining range from the aircraft to the interrogated ground installation based upon the time interval between transmission of an interrogating signal and the instant of reception of the ground installation's reference signal response.

3. An improved landing system as claimed in claim 2, wherein said airborne processing means comprises range tracking gate means, responsive to the timing signals from the interrogator and to the times of arrival in the aircraft of said reference signals and said precision guidance signals which are radiated in response to said interrogating signals, for storing a plurality of all received signals, for computing running averages of said plurality of received signals, for comparing subsequently received signals against said running averages, and for rejecting one or more of said subsequently received signals which fall outside predetermined limits of said running averages.

4. An improved landing system as claimed in claim 2, wherein each ground installation includes an omni-directional antenna, and said reference signals being radiated by the ground installations through said omni-directional antennas.

5. An improved landing system as claimed in claim 4, wherein said transmitter comprises means to radiate reference signals from the ground installations that are encoded to indentify the respective ground installations.

6. An improved landing system as claimed in claim 1, wherein the interrogator comprises means for radiating signals from the aircraft in the DME assigned frequency band, and wherein the transmitter comprises means to radiate guidance signals from the ground installation at a different frequency assigned to the landing system.

7. An improved landing system as claimed in claim 1, wherein the guidance antennas of each ground installation include plural directional radiating means arranged in pairs and operative to radiate guidance signal beams paired about the guidance path, said radiating means including overlapping paired localizer radiating means directed on horizontally opposite sides of the centerline and further including overlapping paired glideslope radiating means directed above and below said predetermined glideslope; and wherein each ground installation includes signal timing and switching means including said trigger input connected to the TACAN/DME receiver output to be triggered thereby upon reception of an interrogating signal, and the timing and switching means being operative to couple a different directional radiating means to the transmitter means to radiate each successive guidance signal beam of a response from the respective localizer and glideslope radiating means.

8. An improved landing system as claimed in claim 7, wherein each airborne installation includes indicator means for indicating the deviation of the aircraft from the landing path, and wherein the means for processing said responses comprises a navigation signal processor, connected to said indicator means and responsive to guidance signals received from the airborne receiving means and responsive to the time positions of said received guidance signals in each sequence, for pairing the received guidance signals and comparing the intensities of the signals of each pair to generate and deliver to said indicator means output signals for indicating deviations from said landing path.

9. In a system for guiding an aircraft along a path defined by a predetermined glideslope and a centerline, the system having:

(a) a reference installation which includes a transmitter which radiates a sequence of responses to the aircraft in response to a trigger signal, the responses including precision guidance signals radiated through directional guidance antennas directed along the guidance path, the reference installation having a TACAN/DME receiver tuned to a DME frequency assigned to that reference installation, the TACAN/DME receiver having triggering means for providing a trigger signal to the trigger input of the transmitter, the trigger signal occurring in response to reception of an interrogating signal; and (b) an airborne installation which includes means for receiving and processing said responses to provide indications for guiding the aircraft to the reference installation, and having a TACAN/DME interrogator and antenna means for radiating interrogating signals to the reference installation, the interrogator being tunable to assigned DME frequencies to select and uniquely interrogate a particular reference installation, the improvement comprising:

means, carried by the airborne installation, for receiving a timing signal form said interrogator which is representative of the instant of transmission of each interrogating signal and for synchronizing the received responses with the interrogating signals radiated by that airborne installation.

* * * * *